United States Patent
Furutani et al.

(10) Patent No.: US 9,825,300 B2
(45) Date of Patent: Nov. 21, 2017

(54) ALUMINUM ALLOY FOIL FOR ELECTRODE CURRENT COLLECTOR, METHOD FOR MANUFACTURING SAME, AND ELECTRODE MATERIAL

(71) Applicants: UACJ Corporation, Chiyoda-ku, Tokyo (JP); UACJ Foil Corporation, Chuo-ku, Tokyo (JP)

(72) Inventors: Tomohiko Furutani, Kusatsu (JP); Kenji Yamamoto, Kusatsu (JP); Satoshi Suzuki, Chiyoda-ku (JP); Masakazu Seki, Chiyoda-ku (JP)

(73) Assignees: UACJ CORPORATION, Tokyo (JP); UACJ FOIL CORPORATION, Tokyo (JP)

( * ) Notice: Subject to any disclaimer, the term of this patent is extended or adjusted under 35 U.S.C. 154(b) by 37 days.

(21) Appl. No.: 14/403,547

(22) PCT Filed: May 16, 2013

(86) PCT No.: PCT/JP2013/063722
§ 371 (c)(1),
(2) Date: Nov. 24, 2014

(87) PCT Pub. No.: WO2013/176038
PCT Pub. Date: Nov. 28, 2013

(65) Prior Publication Data
US 2015/0188145 A1    Jul. 2, 2015

(30) Foreign Application Priority Data
May 25, 2012    (JP) .................................. 2012-119647

(51) Int. Cl.
H01M 4/66    (2006.01)
C22F 1/04    (2006.01)
C22C 21/00    (2006.01)
H01M 4/04    (2006.01)

(52) U.S. Cl.
CPC ............. *H01M 4/662* (2013.01); *C22C 21/00* (2013.01); *C22F 1/04* (2013.01); *H01M 4/043* (2013.01); *H01M 4/0404* (2013.01); *H01M 2220/30* (2013.01)

(58) Field of Classification Search
None
See application file for complete search history.

(56) References Cited

FOREIGN PATENT DOCUMENTS

| JP | 2007-113098 A | | 5/2007 |
|---|---|---|---|
| JP | 2008-150651 A | | 7/2008 |
| JP | 2010-100919 A | | 5/2010 |
| JP | 2010-236055 A | | 10/2010 |
| JP | 2011-026656 A | | 2/2011 |
| JP | 2011026656 A | * | 2/2011 |
| JP | 2011-074433 A | | 4/2011 |
| JP | 2011074433 A | * | 4/2011 |
| JP | 2011-089196 A | | 5/2011 |
| JP | 2011-144440 A | | 7/2011 |
| WO | 2008/068981 A1 | | 6/2008 |

OTHER PUBLICATIONS

International Search Report dated Jul. 2, 2013, issued in corresponding International Application No. PCT/JP2013/063722, filed May 16, 2013, 4 pages.
Chinese Office Action dated Dec. 1, 2015, issued in corresponding Chinese Application No. 201380025664.7, filed May 16, 2013, 20 pages.
Extended European Search Report dated Feb. 25, 2016, issued in corresponding European Application No. 13793987.2, filed May 16, 2013, 6 pages.

* cited by examiner

*Primary Examiner* — Barbara Gilliam
*Assistant Examiner* — Zhongqing Wei
(74) *Attorney, Agent, or Firm* — Christensen O'Connor Johnson Kindness PLLC

(57) ABSTRACT

The present invention provides an aluminum alloy foil, capable of going under thin rolling during its manufacture. The aluminum alloy foil shall also avoid cuts during the active material paste coating process and wrinkles during the press working process, and have suitable strength for the series of manufacturing processes from the manufacture of the aluminum alloy foil to the manufacture of the electrode material. Further, the present invention provides an aluminum alloy foil for electrode current collector, including 0.50 to 1.50 mass % (hereinafter mass % is referred to as %) of Mn, 0.05 to 0.50% of Cu, 0.20 to 1.00% of Fe, 0.01 to 0.60% of Si, with the rest consisting of Al and unavoidable impurities, a manufacturing method thereof, and an electrode material. Here, regarding the aluminum alloy foil, a solid solution amount of Mn is 1500 ppm or more, a solid solution amount of Cu is 40 ppm or more, and a tensile strength after a final cold rolling (T1) is 260 MPa or higher and 350 MPa or lower.

9 Claims, No Drawings

ALUMINUM ALLOY FOIL FOR ELECTRODE CURRENT COLLECTOR, METHOD FOR MANUFACTURING SAME, AND ELECTRODE MATERIAL

TECHNICAL FIELD

The present invention relates to an aluminum alloy foil suitable for electrode materials used in secondary batteries such as lithium ion secondary batteries, and in electrical storage devices such as electrical double layer capacitors, lithium ion capacitors and the like. In particular, the present invention relates to an aluminum alloy foil having suitable composition for achieving favorable strength for the series of manufacturing processes from the manufacture of the aluminum alloy foil to the manufacture of the electrode material and having optimized solid solution amount, manufacturing method thereof, and electrode material.

BACKGROUND

Lithium-ion secondary batteries with high energy densities have been used as power sources for portable electronics such as a mobile phone and a notebook computer.

The lithium ion secondary battery is structured with a positive electrode material, a separator, and a negative electrode material. As the positive electrode material, an aluminum alloy foil having superior electrical conductivity and less heat generation without affecting electrical efficiency of a secondary battery has been used. The positive material can be obtained by coating a paste onto both sides of the aluminum alloy foil, the paste containing a lithium-containing metal oxide such as $LiCoO_2$ as a chief component, followed by drying of the coated paste, and then performing compression forming with a pressing machine (hereinafter this process of compression forming is referred to as press working). The positive electrode material thus prepared is then stacked with a separator and a negative electrode material. The stacked structure is then wound, shaped, and encased.

The aluminum alloy foil used for the positive electrode material of the lithium ion secondary battery requires high tensile strength, when the issues of cuts occurring due to the tension during the coating of the active material paste, and the ruptures occurring at the bending portion during winding are taken into consideration. In addition, in the conventional drying step carried out after the coating of the active material paste, heat treatment is carried out at 100 to 160° C. In recent years, there are cases where the heat treatment is carried out at higher temperatures of around 200° C. Here, with respect to the following press working carried out in order to increase the density of the active material, since the strength of the aluminum alloy foil after heat treatment is generally lower than that of the bare foil, high tensile strength after the drying step is also required. When the strength is lowered after the drying step, center buckle is likely to occur during the press working. This would induce wrinkles during winding, which reduces adhesion between the active material and the aluminum alloy foil. In addition, ruptures during the slitting process would likely occur, which would be a serious problem in the manufacture of batteries. In particular, when the adhesion between the active material paste and the surface of the aluminum alloy foil decreases, peeling off of the active material would proceed during the repeated charge and discharge of the battery. This would lead to a problem of decrease in the battery capacity.

Recently, thinning is required for the aluminum alloy foil used in the positive electrode material of the lithium ion secondary battery. Capacity increase and size reduction are seen in the lithium ion secondary batteries, and thus studies to thin the aluminum alloy film used for the positive electrode material in order to increase the capacity of the battery per unit volume have been made.

On the other hand, during the thinning of the aluminum alloy foil, too high tensile strength would result in lower rollability, which would be problematic.

Accordingly, regarding the aluminum ally foil used for the positive electrode material of the lithium ion battery, there have been a demand for thinner foil for higher battery capacity, higher bare foil strength for preventing cuts during the active material paste coating process, and higher strength after the drying step for preventing wrinkles during the press working. In these views, optimization of the conditions without impairing the rollability has been in demand.

In Patent Literature 1, an aluminum alloy foil for an electrode of a lithium ion battery, of which tensile strength of the bare foil being 240 MPa or more, has been suggested. In Patent Literature 2, an aluminum alloy foil for battery electrode current collector, of which tensile strength of the bare foil being 280 to 350 MPa and having superior rollability, has been suggested. However, the aluminum alloy foils disclosed in Patent Literatures 1 and 2 cannot give a solution to all of the issues simultaneously. That is, they cannot simultaneously solve the issues of thinning of the foil for higher capacity, preventing cuts during the active material paste coating process, the process involving a drying step at higher temperatures than the conventional ones, and preventing wrinkles during the press working.

CITATION LIST

Patent Literature

Patent Literature 1: JP 2010-100919A
Patent Literature 2: JP 2011-89196A

SUMMARY OF THE INVENTION

Technical Problem

The present invention has been made by taking the afore-mentioned circumstances into consideration. An object of the present invention is to provide an aluminum alloy foil, the aluminum alloy capable of going under thin rolling during the manufacture of the aluminum alloy foil. The aluminum alloy foil shall also avoid cuts during the active material paste coating process and wrinkles during the press working, and have suitable strength for the series of manufacturing processes from the manufacture of the aluminum alloy foil to the manufacture of the electrode material. Further, the object of the present invention is to provide a manufacturing method of such aluminum alloy foil, and electrode material.

Solution to Problem

The inventors have conducted intensive studies on these issues, and found that when the solid solution amount and the balance of Cu and Mn were adjusted in addition to the alloy composition, a superior aluminum alloy foil for electrode current collector can be obtained. By such optimization, thin rolling can be carried out during the manufacture of the aluminum alloy foil. In addition, the aluminum alloy foil thus obtained has a bare foil strength capable of avoiding cuts during the active material coating process and wrinkles during the press working. The aluminum alloy foil also has a tensile strength after the heat treatment simulating the drying step.

In addition, the present inventors have found that the solid-solution and precipitation state conditions can be managed by optimizing the conditions for homogenization treatment of the ingot and the intermediate annealing during the manufacturing process. The present inventors have found that the tensile strength suitable for the series of manufacturing processes from the manufacture of the aluminum alloy foil to the manufacture of the electrode material can be obtained by such optimization, thereby leading to completion of the present invention.

That is, according to the present invention, an aluminum alloy foil for electrode current collector, comprising: 0.50 to 1.50 mass % (hereinafter mass % is referred to as %) of Mn, 0.05 to 0.50% of Cu, 0.20 to 1.00% of Fe, 0.01 to 0.60% of Si, with the rest consisting of Al and unavoidable impurities, wherein a solid solution amount of Mn is 1500 ppm or more, a solid solution amount of Cu is 40 ppm or more, and a tensile strength after a final cold rolling (T1) is 260 MPa or higher and 350 MPa or lower, is provided.

Preferably, regarding the aluminum alloy foil, a tensile strength after a heat treatment selected from the group consisting of 24 hours at 100° C., 3 hours at 150° C., and 15 minutes at 200° C., is 260 MPa or higher.

Preferably, regarding the aluminum alloy foil, a tensile strength after a heat treatment selected from the group consisting of 24 hours at 100° C., 3 hours at 150° C., and 15 minutes at 200° C. (T2) is 260 MPa or more; and a relational expression of T2−T1≥0 is satisfied.

Preferably, regarding the aluminum alloy foil, an electrical conductivity after the final cold rolling is 42% IACS or higher.

Preferably, the aluminum alloy foil comprises 0.60 to 1.20% of Mn, 0.08 to 0.40% of Cu, 0.30 to 0.80% of Fe, and 0.05 to 0.30% of Si.

Preferably, the aluminum alloy foil has a thickness of 6 to 30 μm.

According to another aspect of the present invention, a method for manufacturing an aluminum alloy foil for electrode current collector, comprising the steps of: performing a homogenization treatment of an aluminum alloy ingot comprising 0.50 to 1.50% of Mn, 0.05 to 0.50% of Cu, 0.20 to 1.00% of Fe, 0.01 to 0.60% of Si, with the rest consisting of Al and unavoidable impurities for 1 to 20 hours at 550 to 620° C.; performing hot rolling; and performing cold rolling; wherein a continuous annealing is conducted immediately before or in the midst of the cold rolling, at a sheet thickness of 0.8 to 4.0 mm and an annealing temperature of 350 to 550° C., is provided.

Preferably, the manufacturing method further comprises the step of performing cooling after the homogenization treatment, wherein a cooling speed during a temperature range from 500 to 400° C. is 35° C./hour or more.

Preferably, a total rolling period during the hot rolling is less than 30 minutes.

Preferably, the manufacturing method further comprises the step of performing cooling after completion of the hot rolling until starting of the cold rolling, wherein a cooling speed during a temperature range from 300 to 100° C. is 7° C./hour or more.

According to another aspect of the present invention, an electrode current collector comprising an aluminum alloy foil and an active material layer, wherein the aluminum alloy foil is the aluminum alloy foil of any one of the aforementioned aluminum alloy foil, is provided.

Effect of the Invention

The aluminum alloy foil for electrode current collector of the present invention has a bare foil strength which is not excessively high, and thus can be thinned easily. Therefore, the aluminum alloy foil can suitably be applied for increasing the capacity of the lithium ion secondary battery. In addition, since the aluminum alloy foil of the present invention has a solid solution amount suitable for the series of manufacturing processes from the manufacture of the aluminum alloy foil to the manufacture of the electrode material, the strength would be optimized, and the issue of cuts due to the tension during the active material paste coating would be solved. Further, since the strength after the drying step performed after the active material paste coating process would increase, the aluminum alloy foil would hardly deform during the press working, and can avoid wrinkles and ruptures during the slitting process. Accordingly, the aluminum alloy foil can safely and certainly be used for the electrode current collector of an electrical storage device such as a lithium ion secondary battery.

DESCRIPTION OF EMBODIMENTS

<Composition of Aluminum Alloy Foil>

The aluminum alloy foil for lithium ion battery of the present invention comprises: 0.50 to 1.50% of Mn, 0.05 to 0.50% of Cu, 0.20 to 1.00% of Fe, 0.01 to 0.60% of Si, with the rest consisting of Al and unavoidable impurities.

Mn is an element that increases strength and provides heat resistance capable of enduring the heat treatment during the drying step, by its addition. Here, 0.50 to 1.50% of Mn is included. When the additive amount of Mn is less than 0.50%, there is no contribution to the improvement in strength. On the other hand, when the additive amount of Mn exceeds 1.50%, the strength becomes excessively high, thereby decreasing the rollability. The more preferable additive amount of Mn is 0.60 to 1.20%.

Cu is an element that improves strength and also increases strength by the heat treatment during the drying step, by its addition. Here, 0.05 to 0.50% of Cu is included. When the additive amount of Cu is less than 0.05%, the solid solution amount of Cu would decrease, resulting in decrease in strength. On the other hand, when the additive amount of Cu exceeds 0.50%, the work hardening would become high, and then cuts would tend to occur during the foil rolling. The more preferable additive amount of Cu is 0.08 to 0.4%.

Fe is an element that increases strength by its addition. Here, 0.20 to 1.00 of Fe is included. When the additive amount of Fe is less than 0.20%, there is no contribution to the improvement in strength. On the other hand, when the additive amount of Fe exceeds 1.00%, the strength would be excessively high, decreasing rollability. The more preferable additive amount of Fe is 0.30 to 0.80%.

Si is an element that increases strength by its addition. Here, 0.01 to 0.60% of Si is included. When the additive amount of Si is less than 0.01%, there is no contribution to the improvement in strength. In addition, Si is included in common Al base metal as impurities. As a result, in order to restrict the amount of Si to less than 0.01%, a high-purity base metal need be used. This is difficult to achieve in view of economic reasons. On the other hand, when the additive amount of Si exceeds to 0.60%, the strength would be excessively high, decreasing rollability. The more preferable additive amount of Si is 0.05 to 0.30%.

The material of the present invention contains unavoidable impurities such as Cr, Ni, Zn, Mg, Ti, B, V, and/or Zr. An amount of each of the unavoidable impurities is preferably 0.02% or less, and a total amount thereof is preferably 0.15% or less.

<Solid Solution Amount>

In the present invention, in order to allow the aluminum alloy foil to have a strength suitable for the series of manufacturing processes from the manufacture of the aluminum alloy foil to the manufacture of the electrode material, the solid solution amount of each of Mn and Cu need be optimized, in addition to the favorable composition mentioned above. By optimizing the solid solution amount of Mn and Cu, the tensile strength of the aluminum alloy foil after the drying step can be made higher than the tensile strength of the aluminum alloy foil after the final cold rolling. In the present specification, "after final cold rolling" means after the final cold rolling, before performing a heat treatment which changes the physical properties of the aluminum alloy foil. Here, "foil rolling" is one type of cold rolling.

It is necessary to form a solid solution of Mn, in order to increase strength and to provide heat resistance capable of enduring the heat treatment performed at high temperature during the drying step. When the addition amount of Mn is 0.5 to 1.5%, the solid solution amount of Mn would be 1500 ppm or more. When the solid solution amount of Mn is less than 1500 ppm, there is little contribution to the improvement in strength. Accordingly, the strength of the bare foil and the foil after heating would be low, thereby causing cuts during the active material paste coating process and wrinkles during the press working. There is no limitation for the upper limit of the solid solution amount of Mn. Here, the upper limit is, for example, 2500 ppm or lower, preferably 2000 ppm or lower. When the solid solution amount of Mn is more than the afore-mentioned value, the work hardening becomes excessively high, and thus the foil becomes prone to cuts during the foil rolling.

It is necessary to form a solid solution of Cu, in order to increase strength and to enhance the precipitation of Cu-based compounds during the heat treatment of the drying step, thereby increasing strength by the precipitation hardening. When the addition amount of Cu is 0.05 to 0.50%, the solid solution amount of Cu would be 40 ppm or more. When the solid solution amount of Cu is less than 40 ppm, there is little contribution to the improvement in strength. Accordingly, the strength of the bare foil and the foil after heating would be low, thereby causing cuts during the active material paste coating process and wrinkles during the press working. There is no limitation for the upper limit of the solid solution amount of Cu. Here, the upper limit is, for example, 200 ppm or lower, preferably 150 ppm or lower. When the solid solution amount of Cu is more than the afore-mentioned value, the work hardening becomes excessively high, and thus the foil becomes prone to cuts during the foil rolling.

The aluminum alloy foil for electrode current collector of the present invention contains Mn, Fe, Si, and Cu as essential components. Therefore, it is suitable to adjust the conditions for homogenization treatment of the ingot and the intermediate annealing, in order to optimize the solid solution amount of Mn and Cu. There is no particular limitation regarding the conditions for homogenization treatment of the ingot and the intermediate annealing. Here, the methods described hereinafter can be mentioned.

<Bare Foil Strength>

The tensile strength of the aluminum alloy foil of the electrode current collector of the present invention after the final cold rolling should be 260 MPa or higher and 350 MPa or lower. When the tensile strength is lower than 260 MPa, the strength would be insufficient, and thus cuts and ruptures tend to occur easily by the tension applied during the active material paste coating process. When the tensile strength is higher than 350 MPa, the strength would be excessively high, thereby resulting in poor rollability and frequent foil cuts. When the solid solution amount of Mn, Fe, Si, and Cu of the alloy component are increased, the work hardening increases. Accordingly, the increase in strength during the cold rolling and foil rolling becomes large, thereby increasing the bare foil strength.

<Strength After Heat Treatment>

The aluminum alloy foil for electrode current collector of the present invention can suitably be used as the positive electrode material. Here, in the manufacturing process of the positive electrode material, a drying step is carried out after coating the active material paste, in order to remove the solvent in the active material. Usually, heat treatment at a temperature of approximately 100 to 200° C. is carried out. In general, heat treatment under such temperature range results in cases where the aluminum alloy foil is softened, thereby changing mechanical characteristics of the aluminum alloy foil. Therefore, the strength of the aluminum alloy foil after the heat treatment becomes important. As for the aluminum alloy added only with Mn, Fe, Si, and Cu, the effect of the solid solution amount of Mn and Cu are considered to be large.

That is, by performing the homogenization treatment of the ingot at high temperature to allow more of the minutely added Mn to form the solid solution, and then maintaining the high solid solution amount by preventing precipitation of Mn as much as possible during the hot rolling, the characteristics of superior heat resistance can be achieved. In addition, considering Cu, high solid solution amount can be maintained by allowing Cu to form the solid solution as much as possible during the homogenization treatment, preventing precipitation of Cu as much as possible during the cooling process after the hot rolling, and allowing Cu to form the solid solution again by the continuous annealing before or in between the cold rolling. Accordingly, precipitation of the Cu-based compounds can be enhanced during the heat treatment at 100 to 200° C. of the drying step after the active material coating process, realizing precipitation hardening, thereby increasing strength.

The aluminum alloy foil of the present invention is not particularly limited so long as the composition and the solid solution amount are optimized. Here, the tensile strength after performing any one of the heat treatment selected among 24 hours at 100° C., 3 hours at 150° C., and 15 minutes at 200° C. (T2) would preferably be 260 MPa or higher, when the manufacture of the electrode material comprising the aluminum alloy foil and the active material layer is considered. The drying step after the coating process for forming the active material layer is suitably adjusted depending on the conditions such as the active material paste used at 100 to 200° C. In the present invention, the tensile strength is optimized by adopting either one of the severe conditions applicable that is, 24 hours at 100° C., 3 hours at 150° C., or 15 minutes at 200° C.

When the tensile strength after the afore-mentioned heat treatment is lower than 260 MPa, the aluminum alloy foil is prone to curved deformation during the press working after the drying step. Accordingly, there are cases where wrinkles and deformation tend to occur during the winding after pressing.

In addition, it is preferable that the relational expression of T2−T1≥0 is satisfied. When the relational expression of T2−T1≥0 is not satisfied, the bare foil strength need be increased in order to achieve sufficiently high tensile strength after the heat treatment. As a result, the rollability may be affected.

Further, in the present invention, the conditions applied are further subdivided. That is, as the conditions representing long period at low temperature, medium period at moderate temperature, and short period at high temperature, heat treatment of 24 hours at 100° C., 3 hours at 150° C., and 15 minutes at 200° C. have been performed. Here, it is preferable that the tensile strength after such heat treatment (T2) is 260 MPa or higher, and satisfies the relational expression of T2−T1≥0.

As described, by allowing the aluminum alloy foil after the heat treatment to have a tensile strength of 260 MPa or higher, wrinkles during the press working process can be more certainly prevented. Here, the heat treatment is either one of the heat treatments of long period at low temperature, medium period at moderate temperature, and short period at high temperature. When the afore-mentioned tensile strength after heat treatment is lower than 260 MPa, the aluminum alloy foil tends to be easily deformed during the press working after the drying step, and there are cases where wrinkles and curved deformation tend to occur during the winding after pressing. In addition, when the relational expression of T2−T1≥0 is not satisfied, the bare foil strength need be increased in order to achieve sufficiently high tensile strength after the heat treatment. As a result, the rollability may be affected.

In the present invention, in order to achieve the afore-mentioned strength, it is preferable to control the homogenization treatment conditions and the intermediate annealing conditions.

<Electrical Conductivity>

In the present invention, it is preferable that the electrical conductivity of the aluminum alloy foil after the final cold rolling is 42% IACS or higher. The electrical conductivity can be appropriately adjusted by the solid solution state of the solute element. From the viewpoint of increasing the capacity, the electrical conductivity is preferably 43% IACS or higher. When the aluminum alloy foil of the present invention is used as the electrode current collector of the lithium ion secondary battery, electrical conductivity of lower than 42% IACS is not preferable since the battery capacity would decrease when the battery is used at a discharging rate exceeding 5 C.

<Manufacturing Method of Aluminum Alloy Foil for Electrode Current Collector>

In one example, the aluminum alloy foil for electrode current collector of the present invention can be manufactured by the following method.

First, an ingot is obtained by the semi-continuous casting or the continuous casting. An aluminum alloy having the afore-mentioned composition can be used to obtain the ingot. Then, it is preferable that the aluminum alloy ingot thus obtained is subjected to a homogenization treatment for 1 to 20 hours at 550 to 620° C. By performing the homogenization treatment, more of each of the minutely added elements can form the solid solution. Particularly, by providing sufficient solid solution amount of Mn, the movement of dislocations can be reduced, thereby achieving higher strength. In addition, microsegregation formed during the casting solidification can be homogenized, thereby allowing rolling without cuts during the following cold rolling and foil rolling.

When the homogenization treatment temperature is lower than 550° C. or the holding period is shorter than 1 hour, the minutely added elements would not form the solid solution sufficiently. Accordingly, the solid solution amount would be insufficient, resulting in cases of unfavorable decrease in strength. In addition, it may be unfavorable since the segregation of the element would not diffuse uniformly, and thus many pinholes are formed. When the temperature exceeds 620° C., the ingot melts locally. Then, a minute amount of hydrogen gas mixed during casting appears on the surface, thereby readily causing swelling on the material surface. The above condition is thus not preferred. Also, when the homogenizing treatment period exceeds 20 hours, there are cases where it turns out to be unfavorable in view of productivity and cost.

In the cooling process after the completion of the homogenization treatment, it is preferable that the cooling speed is 35° C./hour or more for at least the temperature range of 500 to 400° C. When the cooling speed in this temperature range is less than 35° C./hour, sufficient solid solution amount of Mn cannot be achieved, resulting in low heat resistance. After the homogenization treatment and the cooling of the ingot to room temperature, it is preferable to raise the temperature to 400 to 600° C., which is the starting temperature of the hot rolling, and then perform the hot rolling. When the hot rolling is conducted immediately after the homogenizing treatment, the starting of the hot rolling after the completion of the homogenization treatment would be delayed, due to the process flow of the hot rolling. Accordingly, the temperature of the ingot may decrease, or the period retained at lowered temperature would become long, and thus variation of hot temperature condition occurs, which would be problematic. Therefore, in the present invention, the ingot is cooled to room temperature after the completion of the homogenization treatment, and then heated again in accordance with the progress of the hot rolling. By starting the hot rolling in such conditions, the afore-mentioned problems can be solved, and variation in the metal structure can be suppressed to achieve stable quality. Here, it is preferable that the cooling procedure for the hot rolling is also carried out with the cooling speed of 35° C./hour or more for the temperature range of 500 to 400° C.

It is preferable that the total rolling period of the hot rolling is less than 30 minutes. In the hot rolling, it is important to prevent the precipitation of Mn during the rolling, thereby maintaining the solid solution amount of Mn. When the total rolling period is 30 minutes or more, the precipitation of Mn proceeds, and there are cases where sufficient solid solution amount of Mn for increasing strength cannot be achieved.

In the cooling process after the completion of the hot rolling, it is preferable that the cooling speed of the aluminum sheet is 7° C./hour or more for at least the temperature range of 300 to 100° C. The cooling speed can be controlled by air cooling using a fan. When the cooling speed in this temperature range is less than 7° C./hour, precipitation of Cu proceeds, thereby leading to cases where sufficient solid solution amount of Cu for increasing strength cannot be achieved.

The aluminum alloy sheet obtained by the hot rolling is then subjected to cold rolling and foil rolling. An intermediate annealing is carried out just before or in the midst of the cold rolling, at the sheet thickness of 0.8 to 4.0 mm. The intermediate annealing is carried out using a continuous annealing furnace, and the aluminum alloy sheet is heated to 350 to 550° C.

By performing the intermediate annealing at this stage, the Cu-based compound precipitated during the hot rolling can form a solid solution again, thereby suppressing the movement of dislocations and retaining higher strength. In addition, the crystal grain of the recrystalized particles can be made fine, thereby allowing to perform the following cold rolling and foil rolling without occurrence of cuts. When the sheet thickness is less than 0.8 mm, the work hardening would be small, resulting in decrease in the strength of the aluminum alloy foil after the final cold rolling. When the sheet thickness is more than 4.0 mm, the work hardening would be excessively high, thereby decreasing the rollability, resulting in frequent cuts in the foil. When the annealing temperature is lower than 350° C., the recrystalization would be insufficient, causing cuts in the foil during cold rolling and foil rolling. On the other hand, when the annealing temperature exceeds 550° C., the crystal grain of the recrystalized particles would become coarse, thereby causing cuts in the foil during cold rolling and foil rolling.

Here, in the case of a batch annealing, precipitation of Mn proceeds during the heating, and may result in unfavorable conditions where sufficient solid solution amount of Mn for increasing strength cannot be achieved.

It is preferable that the thickness of the aluminum alloy foil after the final cold rolling is adjusted to 6 to 30 μm. Here, double rolling may be performed as necessary. When the thickness is less than 6 μm, it is unfavorable since it becomes prone to generate pin holes during foil rolling. When the thickness exceeds 30 μm, it is unfavorable since the volume and weight of the electrode current collector would increase and the volume and weight of the active material would decrease in the same occupied space. This would lead to decrease in battery capacity when it is used for a lithium ion secondary battery.

The aluminum alloy foil prepared by the afore-mentioned process can be provided with an intervenient layer in between the active material layer and the aluminum alloy foil. Such intervenient layer comprises a binding agent, a conductive assistant agent, and the like in order to decrease the electrical resistance and to increase adhesion property of the active material.

EXAMPLES

Examples 1 to 11 and Comparative Examples 12 to 27

The present invention will be explained in detail with reference to Examples, however, the following Examples are merely provided for exemplification, and thus the present invention shall not be limited to these Examples.

Aluminum alloys having the compositions as designated in Table 1 were subjected to casting using semi-continuous casting to prepare ingots with a thickness of 500 mm. Next, the ingots were subjected to scalper, followed by homogenization treatment under conditions designated in Table 2. After the homogenization treatment, hot rolling was performed, followed by intermediate annealing. Then, cold rolling and foil rolling were conducted successively to give an aluminum alloy foil having a foil thickness of 15 μm. Comparative Examples were prepared in a similar manner as the Examples.

TABLE 1

| | | Chemical Component (mass %) | | | | |
|---|---|---|---|---|---|---|
| | Alloy | Mn | Cu | Fe | Si | Al and unavoidalbe impurities |
| Example | A | 1.02 | 0.16 | 0.61 | 0.22 | rest |
| | B | 0.98 | 0.24 | 0.51 | 0.58 | rest |
| | C | 1.02 | 0.05 | 0.96 | 0.24 | rest |
| | D | 0.91 | 0.45 | 0.61 | 0.12 | rest |
| | E | 1.49 | 0.20 | 0.22 | 0.25 | rest |
| | F | 1.20 | 0.13 | 0.62 | 0.05 | rest |
| | G | 0.56 | 0.31 | 0.54 | 0.24 | rest |
| Comparative Example | H | 1.58 | 0.28 | 0.65 | 0.23 | rest |
| | I | 0.41 | 0.10 | 0.72 | 0.33 | rest |
| | J | 0.94 | 0.55 | 0.59 | 0.31 | rest |
| | K | 0.88 | 0.02 | 0.62 | 0.25 | rest |
| | L | 0.99 | 0.34 | 1.18 | 0.33 | rest |
| | M | 1.10 | 0.11 | 0.14 | 0.24 | rest |
| | N | 1.31 | 0.29 | 0.45 | 0.68 | rest |

TABLE 2

| | | | Preparation Conditions | | | | | | |
|---|---|---|---|---|---|---|---|---|---|
| | | | Homogenization Treatment Process | | Hot Rolling Process | | | Intermediate Annealing | |
| | | | | | Cooling Speed | Total | Cooling Speed | Sheet | |
| Sample No. | | Alloy | Temperature (° C.) | Period (hr) | from 500° C. to 400° C. (° C./hour) | Rolling Period (min) | from 300° C. to 100° C. (° C./hour) | Type | Thickness (mm) | Temperature (° C.) |
| Example | 1 | A | 610 | 3 | 45 | 22 | 10 | CAL | 2.1 | 500 |
| | 2 | B | 600 | 3 | 39 | 20 | 14 | CAL | 1.0 | 450 |
| | 3 | C | 600 | 5 | 42 | 24 | 11 | CAL | 2.4 | 450 |
| | 4 | D | 580 | 3 | 50 | 19 | 9 | CAL | 1.8 | 520 |
| | 5 | E | 610 | 3 | 46 | 21 | 9 | CAL | 1.0 | 500 |
| | 6 | F | 580 | 5 | 44 | 21 | 12 | CAL | 1.8 | 480 |
| | 7 | G | 600 | 5 | 40 | 19 | 10 | CAL | 2.4 | 480 |
| | 8 | A | 550 | 10 | 41 | 18 | 10 | CAL | 2.1 | 500 |
| | 9 | A | 620 | 1 | 41 | 24 | 11 | CAL | 2.1 | 500 |
| | 10 | A | 610 | 3 | 48 | 20 | 13 | CAL | 4.0 | 350 |
| | 11 | A | 610 | 3 | 42 | 20 | 13 | CAL | 0.8 | 550 |
| Comparative Example | 12 | H | 610 | 1 | 46 | 23 | 9 | CAL | 2.4 | 500 |
| | 13 | I | 580 | 5 | 43 | 18 | 11 | CAL | 2.4 | 520 |
| | 14 | J | 610 | 3 | 44 | 23 | 10 | CAL | 2.4 | 500 |
| | 15 | K | 580 | 3 | 49 | 20 | 14 | CAL | 1.8 | 500 |

TABLE 2-continued

| | | Preparation Conditions | | | | | | |
|---|---|---|---|---|---|---|---|---|
| | | Homogenization Treatment Process | | Hot Rolling Process | | | Intermediate Annealing | |
| Sample No. | Alloy | Temperature (° C.) | Period (hr) | Cooling Speed from 500° C. to 400° C. (° C./hour) | Total Rolling Period (min) | Cooling Speed from 300° C. to 100° C. (° C./hour) | Type | Sheet Thickness (mm) | Temperature (° C.) |
| 16 | L | 600 | 3 | 41 | 21 | 12 | CAL | 1.8 | 480 |
| 17 | M | 600 | 5 | 45 | 25 | 9 | CAL | 2.4 | 520 |
| 18 | N | 610 | 3 | 50 | 23 | 11 | CAL | 2.1 | 500 |
| 19 | A | 500 | 3 | 49 | 20 | 14 | CAL | 2.1 | 480 |
| 20 | A | 610 | 0.5 | 44 | 19 | 13 | CAL | 1.8 | 480 |
| 21 | A | 610 | 3 | 17 | 21 | 13 | CAL | 1.0 | 520 |
| 22 | A | 580 | 5 | 43 | 41 | 11 | CAL | 2.1 | 500 |
| 23 | A | 600 | 3 | 38 | 20 | 5 | CAL | 1.8 | 500 |
| 24 | A | 580 | 3 | 38 | 20 | 9 | Batch | 1.0 | 400 |
| 25 | A | 610 | 3 | 45 | 20 | 12 | CAL | 5.5 | 580 |
| 26 | A | 610 | 1 | 36 | 18 | 6 | CAL | 0.3 | 400 |
| 27 | A | 580 | 3 | 47 | 20 | 11 | CAL | 1.8 | 330 |

Subsequently, the positive electrode material of the lithium ion secondary battery was prepared using each of the aluminum alloy foils. PVDF as a binder was added to the active material including $LiCoO_2$ as a chief component to give a positive electrode active material paste. The positive electrode active material paste was applied onto both sides of the aluminum alloy foil having a width of 30 mm. The positive electrode active material paste was dried by the heat treatment under the three conditions of 24 hours at 100° C., 3 hours at 150° C., and 15 minutes at 200° C. Subsequently, compression forming was carried out using a roller pressing machine to increase the density of the active material.

For each of the aluminum alloy foils thus prepared, rollability, tensile strength after final cold rolling, and tensile strength after the heat treatment of 24 hours at 100° C., 3 hours at 150° C., and 15 minutes at 200° C. were evaluated. In addition, the difference (T2−T1) between the tensile strength after final cold rolling (T1) and each of the tensile strength after each of the heat treatment (T2) were evaluated. The results are shown in Table 3. Then, occurrence of wrinkles during the active material pressing process was evaluated for each of the positive electrode material. The results are shown in Table 4.

TABLE 3

| | | | Bare Foil Strength | | | Solid Solution | | Heat Treatment for 24 hours at 100° C. | | Heat Treatment for 3 hours at 150° C. | | Heat Treatment for 15 minutes at 200° C. | |
|---|---|---|---|---|---|---|---|---|---|---|---|---|---|
| | Sample No. | Alloy | Tensile Strength (MPa) | Rollability | Electrical Conductivity (% IACS) | Amount Mn (ppm) | Cu (ppm) | Tensile Strength (MPa) | T2−T1 | Tensile Strength (MPa) | T2−T1 | Tensile Strength (MPa) | T2−T1 |
| Example | 1 | A | 291 | acceptable | 43.8 | 1690 | 55 | 320 | 29 | 319 | 28 | 305 | 14 |
| | 2 | B | 314 | acceptable | 43.1 | 1665 | 62 | 345 | 31 | 343 | 29 | 329 | 15 |
| | 3 | C | 278 | acceptable | 44.3 | 1652 | 45 | 306 | 28 | 305 | 27 | 291 | 13 |
| | 4 | D | 347 | acceptable | 42.7 | 1622 | 132 | 377 | 30 | 375 | 28 | 362 | 15 |
| | 5 | E | 326 | acceptable | 42.1 | 1832 | 54 | 355 | 29 | 352 | 26 | 348 | 22 |
| | 6 | F | 283 | acceptable | 44.1 | 1741 | 52 | 310 | 27 | 307 | 24 | 294 | 11 |
| | 7 | G | 292 | acceptable | 44.2 | 1552 | 66 | 315 | 23 | 309 | 17 | 296 | 4 |
| | 8 | A | 282 | acceptable | 44.0 | 1638 | 48 | 310 | 28 | 308 | 26 | 296 | 14 |
| | 9 | A | 290 | acceptable | 43.2 | 1702 | 56 | 318 | 28 | 315 | 25 | 304 | 14 |
| | 10 | A | 299 | acceptable | 43.5 | 1665 | 48 | 328 | 29 | 327 | 28 | 314 | 15 |
| | 11 | A | 283 | acceptable | 44.1 | 1673 | 68 | 310 | 27 | 308 | 25 | 295 | 12 |
| Comparative Example | 12 | H | 362 | unacceptable | 38.6 | 1856 | 66 | 394 | 32 | 392 | 30 | 388 | 26 |
| | 13 | I | 244 | acceptable | 48.2 | 1421 | 49 | 271 | 27 | 265 | 21 | 242 | −2 |
| | 14 | J | 381 | unacceptable | 41.7 | 1655 | 155 | 411 | 30 | 409 | 28 | 395 | 14 |
| | 15 | K | 242 | acceptable | 45.5 | 1615 | 27 | 270 | 28 | 266 | 24 | 248 | 6 |
| | 16 | L | 357 | unacceptable | 41.9 | 1611 | 70 | 388 | 31 | 386 | 29 | 371 | 14 |
| | 17 | M | 252 | acceptable | 44.4 | 1713 | 43 | 279 | 27 | 272 | 20 | 255 | 3 |
| | 18 | N | 355 | unacceptable | 41.1 | 1778 | 67 | 385 | 30 | 385 | 30 | 366 | 11 |
| | 19 | A | 245 | acceptable | 47.7 | 1283 | 28 | 259 | 14 | 256 | 11 | 225 | −20 |
| | 20 | A | 251 | acceptable | 47.3 | 1221 | 31 | 263 | 12 | 259 | 8 | 227 | −24 |
| | 21 | A | 265 | acceptable | 46.8 | 1215 | 43 | 290 | 25 | 285 | 20 | 251 | −14 |
| | 22 | A | 267 | acceptable | 46.6 | 1255 | 44 | 292 | 26 | 298 | 21 | 249 | −18 |
| | 23 | A | 249 | acceptable | 45.3 | 1588 | 17 | 273 | 24 | 270 | 21 | 256 | 7 |
| | 24 | A | 273 | acceptable | 47.1 | 1229 | 19 | 299 | 26 | 293 | 20 | 258 | −15 |
| | 25 | A | 354 | unacceptable | 41.4 | 1701 | 74 | 386 | 32 | 382 | 28 | 367 | 13 |
| | 26 | A | 254 | unacceptable | 46.6 | 1577 | 42 | 277 | 23 | 273 | 19 | 258 | 4 |
| | 27 | A | 360 | unacceptable | 41.9 | 1684 | 36 | 379 | 19 | 377 | 17 | 344 | −16 |

Table 4

| Sample No. | | Alloy | Cuts During Active Material Applying Process | Heat Treatment for 24 hours at 100° C. Wrinkles During Press Working Process | Heat Treatment for 3 hours at 150° C. Wrinkles During Press Working Process | Heat Treatment for 15 minutes at 200° C. Wrinkles During Press Working Process |
|---|---|---|---|---|---|---|
| Example | 1 | A | None | None | None | None |
| | 2 | B | None | None | None | None |
| | 3 | C | None | None | None | None |
| | 4 | D | None | None | None | None |
| | 5 | E | None | None | None | None |
| | 6 | F | None | None | None | None |
| | 7 | G | None | None | None | None |
| | 8 | A | None | None | None | None |
| | 9 | A | None | None | None | None |
| | 10 | A | None | None | None | None |
| | 11 | A | None | None | None | None |
| Comparative Example | 12 | H | None | None | None | None |
| | 13 | I | Occurred | None | None | Occurred |
| | 14 | J | None | None | None | None |
| | 15 | K | Occurred | None | None | Occurred |
| | 16 | L | None | None | None | None |
| | 17 | M | Occurred | None | None | Occurred |
| | 18 | N | None | None | None | None |
| | 19 | A | Occurred | Occurred | Occurred | Occurred |
| | 20 | A | Occurred | None | Occurred | Occurred |
| | 21 | A | None | None | None | Occurred |
| | 22 | A | None | None | None | Occurred |
| | 23 | A | Occurred | None | None | Occurred |
| | 24 | A | None | None | None | Occurred |
| | 25 | A | None | None | None | None |
| | 26 | A | Occurred | None | None | Occurred |
| | 27 | A | None | None | None | None |

<Tensile Strength>

The tensile strength of the aluminum alloy foil which had been cut out in a direction of the rolling was measured with an Instron tension tester AG-10kNX, manufactured by Shimadzu Corporation. The measurement was performed under conditions with a test piece size of 10 mm×100 mm, at a gauge length of 50 mm, and at a crosshead speed of 10 mm/min. In addition, in order to simulate the drying step, the aluminum alloy foil after the heat treatment of 24 hours at 100° C., 3 hours at 150° C., or 15 minutes at 200° C. was cut out in a direction of the rolling. Then, the tensile strength was measured in the same manner as above. Regarding the tensile strength after the final cold rolling, tensile strength of 260 MPa or higher and 350 MPa or lower was considered to be acceptable and the tensile strength out of such range was considered to be unacceptable. With regard to the tensile strength after the heat treatment of 24 hours at 100° C., 3 hours at 150° C., or 15 minutes at 200° C., the tensile strength of 260 MPa or higher was considered to be acceptable and the tensile strength of less than 260 MPa was considered to be unacceptable.

<Electrical Conductivity>

Specific resistance value was measured by a four-terminal method, and was converted to electrical conductivity.

<Rollability>

Aluminum alloy foils that were able to be continuously rolled to the thickness of 6 µm without occurrence of ruptures were considered to be acceptable, and those with ruptures or being unable of rolling were considered to be unacceptable.

<Solid Solution Amount>

The solid solution amount of Mn and Cu were measured in the following manner. Aluminum alloy foil (1.0 g) and phenol (50 mL) were heated to approximately 200° C. to allow the aluminum alloy to decompose. After adding benzyl alcohol (100 mL) as the anti-hardening agent, the intermetallic compounds were separated by filtration. The filtrate was used for IPC atomic emission spectroscopy.

<Occurrence of Cuts During Active Material Paste Coating Process>

Occurrence of cuts on the aluminum alloy foil set on the roll during the active material paste coating process was evaluated by visual observation. When there was not cut, it was considered to be acceptable, and when there was a cut, it was considered to be unacceptable.

<Occurrence of Wrinkle During Press Working Process>

Occurrence of wrinkles on the aluminum alloy foil having the active material coated thereon, used in the press working process, was evaluated by visual observation. When there was no wrinkle, it was considered to be acceptable, and when there was a wrinkle, it was considered to be unacceptable.

In Examples 1 to 11, there was no rupture during the foil rolling, there was no cut during the active material paste coating process, and the active material did not peel off. Therefore, good evaluation results were achieved.

In Comparative Example 12, excessive amount of Mn resulted in too high work hardening, thereby resulting in occurrence of cuts during the foil rolling.

In Comparative Example 13, the low amount of Mn resulted in insufficient bare foil strength and insufficient strength after the heat treatment of 15 minutes at 200° C., thereby causing cuts during the active material paste coating process and wrinkles during the press working process.

In Comparative Example 14, excessive amount of Cu resulted in too high work hardening, thereby resulting in occurrence of cuts during the foil rolling.

In Comparative Example 15, the low amount of Cu resulted in insufficient bare foil strength and insufficient strength after the heat treatment of 15 minutes at 200° C., thereby causing cuts during the active material paste coating process and wrinkles during the press working process.

In Comparative Example 16, excessive amount of Fe resulted in too high work hardening, thereby resulting in occurrence of cuts during the foil rolling.

In Comparative Example 17, the low amount of Fe resulted in insufficient bare foil strength and insufficient strength after the heat treatment of 15 minutes at 200° C., thereby causing cuts during the active material paste coating process and wrinkles during the press working process.

In Comparative Example 18, excessive amount of Si resulted in too high work hardening, thereby resulting in occurrence of cuts during the foil rolling.

In Comparative Example 19, the low homogenization treatment temperature resulted in insufficient solid solution amount. Accordingly, bare foil strength and strength after the heat treatment of 24 hours at 100° C., 3 hours at 150° C., and 15 minutes at 200° C. were insufficient, thereby causing cuts during the active material paste coating process and wrinkles during the press working process.

In Comparative Example 20, the short homogenization treatment period resulted in insufficient solid solution amount. Accordingly, bare foil strength and strength after the heat treatment of 3 hours at 150° C. and 15 minutes at 200° C. were insufficient, thereby causing cuts during the active material paste coating process and wrinkles during the press working process.

In Comparative Example 21, the slow cooling speed after the homogenization treatment resulted in insufficient solid solution amount. Accordingly, strength after the heat treatment of 15 minutes at 200° C. was insufficient, thereby causing wrinkles during the press working process.

In Comparative Example 22, the long total rolling period during the hot rolling resulted in progress of precipitation and insufficient solid solution amount. Accordingly, strength after the heat treatment of 15 minutes at 200° C. was insufficient, thereby causing wrinkles during the press working process.

In Comparative Example 23, the slow cooling speed after the hot rolling resulted in insufficient solid solution amount. Accordingly, bare foil strength and strength after the heat treatment of 3 hours at 150° C. 15 minutes at 200° C. were insufficient, thereby causing cuts during the active material paste coating process and wrinkles during the press working process.

In Comparative Example 24, sufficient solid solution amount was not achieved, since the intermediate annealing was performed by batch process. Accordingly, strength after the heat treatment of 15 minutes at 200° C. was insufficient, thereby causing wrinkles during the press working process.

In Comparative Example 25, the high intermediate annealing temperature resulted in coarse crystal grain of the recrystalized particles. In addition, since the aluminum alloy sheet during the intermediate annealing was thick, the work hardening increased excessively, thereby causing cuts during the foil rolling.

In Comparative Example 26, since the aluminum alloy sheet during the intermediate annealing was thin, the work hardening decreased, resulting in insufficient bare foil strength and insufficient strength after the heat treatment of 15 minutes at 200° C. Accordingly, there were cuts during the active material paste coating process and wrinkles during the press working process.

In Comparative Example 27, the low intermediate annealing temperature resulted in insufficient recrystallization, thereby causing cuts during the foil rolling.

The invention claimed is:

1. An aluminum alloy foil for electrode current collector, comprising:
   0.5% to 1.50% by mass (hereinafter % by mass is referred to as %) of Mn, 0.05% to 0.50% of Cu, 0.20% to 1.00% of Fe, 0.01% to 0.60% of Si, with the rest consisting of Al and unavoidable impurities, wherein
   a solid solution amount of Mn is 1500 ppm or more, a solid solution amount of Cu is 40 ppm or more, and a tensile strength (T1) after a final cold rolling is 260 MPa or higher and 350 MPa or lower, and
   T1 and a tensile strength (T2) after a heat treatment of the aluminum alloy foil, wherein the heat treatment is selected from the group consisting of 24 hours at 100° C., 3 hours at 150° C., and 15 minutes at 200° C., satisfies a relational expression of $T2-T1 \geq 0$; and
   prior to the heat treatment, the aluminum alloy foil is obtained by performing a hot rolling to an ingot to obtain an aluminum alloy sheet, followed by cooling of the aluminum alloy sheet after completion of the hot rolling until starting of a cold rolling, wherein a cooling speed during a temperature range from 300 to 100° C. is 7° C./hour or more.

2. The aluminum alloy foil of claim 1, wherein T2 is 260 MPa or higher.

3. The aluminum alloy foil of claim 1, wherein the electrical conductivity of the aluminum alloy foil after the final cold rolling is 42% or higher of the International Annealed Copper Standard.

4. The aluminum alloy foil of claim 1, comprising 0.60% to 1.20% of Mn, 0.08% to 0.40% of Cu, 0.30% to 0.80% of Fe, and 0.05% to 0.30% of Si.

5. The aluminum alloy foil of claim 1, wherein the foil has a thickness of 6 to 30 μm.

6. A method for manufacturing an aluminum alloy foil for electrode current collector, comprising the steps of:
   performing a homogenization treatment of an aluminum alloy ingot comprising 0.50% to 1.50% of Mn, 0.05% to 0.50% of Cu, 0.20% to 1.00% of Fe, 0.01% to 0.60% of Si, with the rest consisting of Al and unavoidable impurities for 1 to 20 hours at 550 to 620° C.;
   performing hot rolling; and
   performing cold rolling; wherein
   a continuous annealing is conducted immediately before or in the midst of the cold rolling, at a sheet thickness of 0.8 to 4.0 mm and an annealing temperature of 350 to 550° C.; and
   cooling is performed after completion of the hot rolling until starting of the cold rolling, wherein the cooling speed during a temperature range from 300 to 100° C. is 7° C./hour or more.

7. The method for manufacturing of claim 6, further comprising the step of:
   performing cooling after the homogenization treatment, wherein
   a cooling speed during a temperature range from 500 to 400° C. is 35° C./hour or more.

8. The method for manufacturing of claim 6, wherein a total rolling period during the hot rolling is less than 30 minutes.

9. An electrode material comprising an aluminum alloy foil and an active material layer, wherein the aluminum alloy foil is the aluminum alloy foil of claim 1.

* * * * *